3,310,277
VALVE AND VALVE DISC
Helmar Trøst Nielsen, Nordborg, and Knud Aage Hansen, Sonderborg, Denmark, assignors to Danfoss A/S, Nordborg, Denmark, a company of Denmark
Filed June 3, 1964, Ser. No. 372,153
Claims priority, application Germany, July 6, 1963,
D 41,921
7 Claims. (Cl. 251—84)

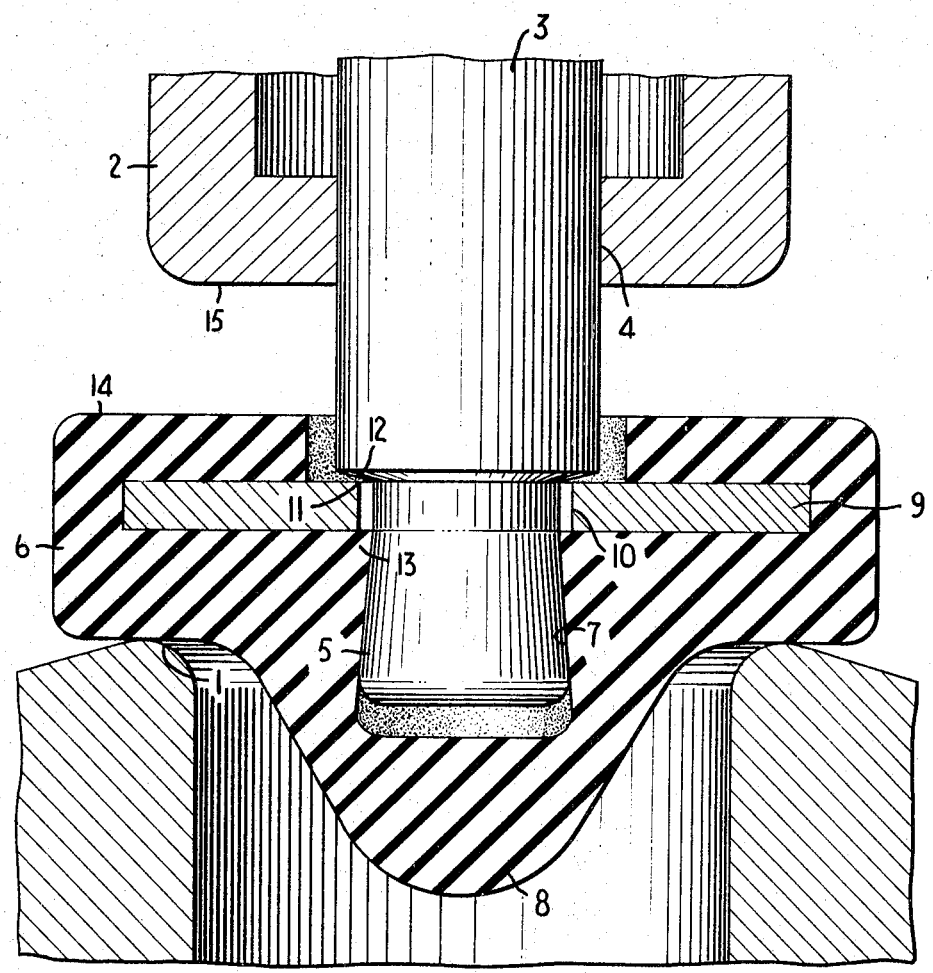

This invention relates generally to valves and more particularly to a new and improved valve disc.

The use of an elastic or resilient material, for example rubber, for the construction of valve discs is known. This kind of disc material lends itself to streamlining in order to reduce the effect of the disc on fluid flow through a valve body. However, in view of the compliance of the material used, the valve discs made must be generally supported by a supporting plate or member which distributes the valve stem pressure equally throughout the sealing surface of the disc. Moreover, securing of the valve disc to an operator such as a valve stem is usually a problem requiring riveting or the use of screws.

In most valve constructions, it is customary to position the valve stem extending inwardly into a valve body and outwardly thereof. Although the valve stem is generally snugly fitted into a valve guide portion of a valve body means are usually provided for preventing fluid leakage along the valve stem, for example by the use of packed valve stems and the like.

In packed valve stem valves, the valve is subject to leakage when the valve packing assembly is removed. In order to preclude this kind of leakage a valve disc is sometimes provided which is constructed with an auxiliary sealing area which is disposed circumferentially of the valve stem and engages the valve stem guide portion of the valve in an effective seal to preclude leakage outwardly of the valve body along the valve stem. Generally, the second or auxiliary seal function is established by actuating the valve disc to an unseated position in which the valve is in an open condition and the disc is moved into a position carrying out its secondary function of sealing the valve stem. The known discs of this type require relatively complex means for mounting or attaching them to the valve stem that actuates them.

A valve disc generally of the type the invention is concerned with was disclosed in our copending application Ser. No. 340,719, filled Jan. 28, 1964, now Patent Number 3,276,741. In the copending disclosure the disc must be made of a relatively softer elastic material than the present invention for reasons later described.

It is a principal object of the present invention to provide a new and improved valve body and simplified, removable and replaceable valve disc in which an auxiliary or second sealing area is provided for effectively sealing the valve stem to preclude leakage along it and outwardly of a valve body.

Another object is to provide a simple valve disc construction in which the disc carries out an auxiliary sealing function sometimes carried out by additional sealing discs employed in various valve constructions.

A feature of the invention is the provision of a valve stem having an axial extension with circumferential surfaces diverging away from the longitudinal axis of said stem and defining jointly with said stem an annular surface of reduced diameter cooperative with the disc to allow alignment of the disc in the event the valve stem is eccentric relative to the valve seat. The disc is provided with an annular rigid disc provided with a central aperture defined by surfaces that cooperate with the valve stem in effecting the alignment.

Another feature is the provision of a cavity in the disc for receiving the aforementioned extension. The cavity is enclosed by walls converging toward an opening in the cavity through which the stem projection is inserted. The cavity walls cooperate with the extension in effectively removably connecting the disc to the valve stem.

The disc is provided with an annular portion such that when the disc is used in valves, for example packed stem valves, in which the seal around the valve stem is to be formed when the valve is opened the annular portion carries out the aforementioned auxiliary sealing function.

Other features and advantages of the valve disc in accordance with the present invention will be better understood as described in the following specification and appended claims, in conjunction with the drawing which is an enlarged fragmentary, sectional view of a valve body provided with a valve disc according to the invention.

Although the present invention will be described as applied to a packed stem valve it is to be understood that the present invention is equally applicable to all types of valves in which the valve disc carries out a secondary sealing function to preclude leakage along the valve stem when the valve is in an open condition and to other valves in which the secondary function is not required.

According to the drawing, a valve body, fragmentarily shown, comprises means defining an annular seat 1 disposed circumferentially of a fluid passageway or opening which is opened and closed by a valve disc according to the invention as later described. The valve body comprises a valve stem guide portion 2 through which a valve stem 3 extends longitudinally snugly through an opening 4 therein inwardly into the valve body. The valve stem 3 is actuatable in opposite directions axially. The valve stem 3 may be actuated axially, for example manually or by means of a thermostatic regulator, not shown, mountable and connectable to the valve stem 3 and having actuator means which are thermostatically actuated for opening and closing the valve.

The valve stem is provided with a rigid, coaxial, extension or cone-shaped member 5 permanently secured to the valve stem 3 having peripheral surfaces extending axially and diverging away from its longitudinal axis corresponding to the axis of the stem and diverging away from the end of the valve stem 3 in the valve body as illustrated. The projection 5 comprises an annular or cylindrical portion of reduced diameter and integral with a rigid, annular tapered portion of the stem. The annular tapered portion functions as later described and extends radially outwardly from the reduced diameter end of the cone-shaped projection and extending radially from the center axis of the valve stem 3 sufficiently to overlap an annular plate in the valve disc as later described.

The valve according to the invention comprises a valve disc 6 made of an elastic material, for example of formed or molded rubber, having a cavity 7 open at one end in which the projection 5 is received. The walls defining the cavity converge in a direction toward an opening into the cavity. The cavity 7 is formed in a shaped portion 8 configured to offer the least resistance to the flow of fluid through the valve. A rigid, annular plate 9 is embedded in the valve disc or the disc can be made with a cavity extending radially outwardly from the open end of the cavity 7, which receives the projection 5, for receiving the plate 9. In the event the disc is provided with a cavity for receiving the plate 9, the disc has an annular resilient portion defining the upper side of such a cavity and having a central opening or mouth sufficiently large to allow the insertion of the plate 9 into its respective cavity.

The plate 9 has a central opening 10 which has a diameter greater than the major diameter of the stem extension 5 so that the extension can be received in its cavity 7. An annular edge 11 circumferentially of the opening 10 engages a tapered annular surface 12 on the end of the valve stem which converges at this end toward its longitudinal axis. The edge 11 and tapered annular portion 12 cooperate in allowing the disc to center itself in the event the valve stem is cocked or canted with respect to the longitudinal axis passing through the valve opening and centrally of the valve seat 1. The disc permits sufficient flexure to allow the disc to center itself on the seat and the edge 11 to position itself on the tapered annular surface of the stem to compensate for valve stem misalignment. The plate 9 extends radially outwardly from the annular portion of least diameter of the extension 5 so that its under side surface tends to hold the annular portion 13 in engagement with the corresponding flared surface of the coaxial extension 5. Thus, the valve disc is mounted on the stem by insertion of the extension 5 into its cavity 7 and is removably mounted on the valve stem but removal of the disc from the stem is harder to effect than connection thereto since the plate 9 tends to compress the annular portion 13 into engagement with the extension 5 when there is relatively axial movement in a direction tending to separate the valve stem and disc. An excellent, positive connection between the valve stem and valve disc is thus readily effected and the valve disc is thereby replaceable.

Moreover, the rigid plate 9 extends radially outwardly from the longitudinal axis of the stem and the axis of the valve seat and is made of a sufficiently rigid material so that the annular portion of the valve disc in which the plate is housed or embedded is effectively compressed between the valve body portion 1 that defines the seat and the plate 9 when the valve is closed and an effective fluid-tight closure or seal is effected when the valve closes.

When the valve stem 3 is actuated to the position illustrated in the drawing, the rigid annular flange 9, which is coaxial with the seat 1, in conjunction with the compressible part of the valve member carries out an effective closing of the valve. When the valve stem is actuated in an opposite direction and sufficiently spaced away from the seat 1, an annular sealing surface 14 provided on the annular portion circumferentially of the valve stem and plate 9 will engage with an underside annular surface 15 of the valve stem guide means 2 of the valve body and carry out an effective seal therebetween to preclude leakage along the valve stem 3 outwardly of the valve body.

Thus by actuating the valve stem 3 in a direction opposite from the direction toward the valve seat 1 for a sufficient distance the secondary function of the valve stem disc is rendered effective and the valve is opened and leakage is completely precluded along the valve stem disc 3 so that in the example illustrated in the event that the valve body in which the invention is being used is, for example a packed stem valve of the type disclosed in our copending application, Ser. No. 331,230 filed Dec. 17, 1963, the valve stem packing, not shown, can be removed and repacked with the valve remaining operative wherever it is being used.

The portion of the valve disc defining the auxiliary sealing surface 14 is made sufficiently flexible to allow insertion of the plate 9 into its cavity in the event the valve disc is not made with the plate already embedded therein.

Those skilled in the art will understand that the cone-shaped extensions 5 can be made tear-drop-shaped and with surfaces converging toward the valve stem in the manner of the example embodiment illustrated. Moreover, the extension preferably has roughened outer surfaces to enhance the gripping action between the extension 5 and the inner walls of the disc defining the cavity 7.

Furthermore, in the embodiment of the valve disc in which the plate 9 is not embedded therein it may be bonded to the disc internally of the cavity, for example by solder, vulcanization, or a suitable adhesive.

While a preferred embodiment of the invention has been shown and described, it will be understood that many modifications and changes can be made within the true spirit and scope of the invention.

What we claim and desire to secure by Letters Patent is:

1. In a valve body having means defining a valve seat, a valve stem extending axially into said valve body, a valve body portion for axially guiding said valve stem, a resilient valve disc mounted in operation on said valve stem and having an annular surface seatable on said seat for closing said valve, said valve stem being mounted in said valve body portion for selective movement axially variably in a direction toward said seat for seating said valve disc on said seat to preclude fluid flow through said valve body and in an opposite direction to unseat said disc to allow fluid flow, said valve stem having at one end in said valve body a coaxial tapered extension extending axially therefrom, said extension having axially extending surfaces diverging radially outwardly away from the longitudinal axis thereof and away from said valve stem, said valve disc having a cavity open at one end for snugly receiving said extension and inner cavity walls defining said cavity converging toward the open end of said cavity, a rigid, metal plate in said valve disc extending radially outwardly from the open end of said cavity and circumferentially of said extension, said plate having a central opening dimensioned to allow said extension to enter said cavity, said plate opening having a transverse dimension smaller than the diameter of said valve stem, said extension comprising a cylindrical, annular portion having a reduced diameter, and said cylindrical portion being disposed at said one end of said valve stem integral therewith.

2. In a valve body according to claim 1, in which said cylindrical portion on said extension and said central opening in said plate are disposed substantially in a common plane.

3. In a valve body according to claim 2, in which said one end of said valve stem comprises an annular tapered portion tapered in the direction of the longitudinal axis of said stem and toward said cylindrical portion, whereby said plate cooperates with said tapered portion in centering said valve disc on said seat regardless if the valve stem is canted and cocked relative to said seat.

4. In a valve body having means defining a valve seat, a valve stem extending axially into said valve body, a valve body portion for axially guiding said valve stem, a resilient valve disc mounted in operation on said valve stem and having an annular surface seatable on said seat for closing said valve, said valve stem being mounted in said valve body portion for selective movement axially variably in a direction toward said seat for seating said valve disc on said seat to preclude fluid flow through said valve body and in an opposite direction to unseat said disc to allow fluid flow, said valve stem having at one end in said valve body a coaxial tapered extension extending axially therefrom, said extension having axially extending surfaces diverging radially outwardly away from the longitudinal axis thereof and away from said valve stem, said valve disc having a cavity open at one end for snugly receiving said extension and inner cavity walls defining said cavity converging toward the open end of said cavity, a rigid, metal plate embedded in said valve disc extending radially outwardly from the open end of said cavity and circumferentially of said extension, said plate having a central opening dimensioned to allow said extension to enter said cavity, said plate opening having a transverse dimension smaller than the diameter of said valve stem.

5. In a valve body having means defining a valve seat, a valve stem extending axially into said valve body, a valve body portion for axially guiding said valve stem, a resilient valve disc mounted in operation on said valve stem and having an annular surface seatable on said seat for closing said valve, said valve stem being mounted in said valve body portion for selective movement axially variably in a direction toward said seat for seating said valve disc on said seat to preclude fluid flow through said valve body and in an opposite direction to unseat said disc to allow fluid flow, said valve stem having at one end in said valve body a coaxial tapered extension extending axially therefrom, said extension having axially extending surfaces diverging radially outwardly away from the longitudinal axis thereof and away from said valve stem, said valve disc having a cavity open at one end for snugly receiving said extension and inner cavity walls defining said cavity converging toward the open end of said cavity, a rigid, metal plate in said valve disc extending radially outwardly from the open end of said cavity and circumferentially of said extension, said plate having a central opening dimensioned to allow said extension to enter said cavity, said plate opening having a transverse dimension smaller than the diameter of said valve stem, said valve disc comprises a cavity in which said plate is housed, said plate being disposed in said cavity and bonded to said valve disc, and said disc having a central opening to allow said extension to be inserted in the first mentioned cavity.

6. In a valve body having means defining a valve seat, a valve stem extending axially into said valve body, a valve body portion for axially guiding said valve stem, a resilient valve disc mounted in operation on said valve stem and having an annular surface seatable on said seat for closing said valve, said valve stem being mounted in said valve body portion for selective movement axially variably in a direction toward said seat for seating said valve disc on said seat to preclude fluid flow through said valve body and in an opposite direction to unseat said disc to allow fluid flow, said valve stem having at one end in said valve body a coaxial tapered extension extending axially therefrom, said extension having axially extending surfaces diverging radially outwardly away from the longitudinal axis thereof and away from said valve stem, said valve disc having a cavity open at one end for snugly receiving said extension and inner cavity walls defining said cavity converging toward the open end of said cavity, a rigid, metal plate in said valve disc extending radially outwardly from the open end of said cavity and circumferentially of said extension, said plate having a central opening dimensioned to allow said extension to enter said cavity, said plate opening having a transverse dimension smaller than the diameter of said valve stem, said valve stem comprising a tapered annular portion at said one end tapered in a direction toward said axial extension, and said plate having an edge circumferentially of said central opening therein for engaging said tapered portion for centering said valve disc on said seat when there is misalignment between said seat and said disc and said valve stem and said seat.

7. In a valve body having means defining a valve seat, a valve stem extending axially into said valve body, a valve body portion for axially guiding said valve stem, a resilient valve disc mounted in operation on said valve stem and having an annular surface seatable on said seat for closing said valve, said valve stem being mounted in said valve body portion for selective movement axially variably in a direction toward said seat for seating said valve disc on said seat to preclude fluid flow through said valve body and in an opposite direction to unseat said disc to allow fluid flow, said valve stem having at one end in said valve body a coaxial tapered extension extending axially therefrom, said extension having axially extending surfaces diverging radially outwardly away from the longitudinal axis thereof and away from said valve stem, said valve disc having a cavity open at one end for snugly receiving said extension and inner cavity walls defining said cavity converging toward the open end of said cavity, a rigid, metal plate in said valve disc extending radially outwardly from the open end of said cavity and circumferentially of said extension, said plate having a central opening dimensioned to allow said extension to enter said cavity, said plate opening having a transverse dimension smaller than the diameter of said valve stem, and said axially extending surfaces of said extension comprising a roughened surface to enhance gripping between said extension and said disc inner walls defining said cavity.

References Cited by the Examiner

FOREIGN PATENTS

| | | |
|---|---|---|
| 1,193,567 | 4/1959 | France. |
| 888,790 | 9/1953 | Germany. |
| 1,087,860 | 8/1960 | Germany. |

M. CARY NELSON, *Primary Examiner.*

R. C. MILLER, *Assistant Examiner.*